No. 620,382. Patented Feb. 28, 1899.
H. E. TWOMLEY.
CHECKING OR UNCHECKING ATTACHMENT.
(Application filed May 14, 1898.)
(No Model.)
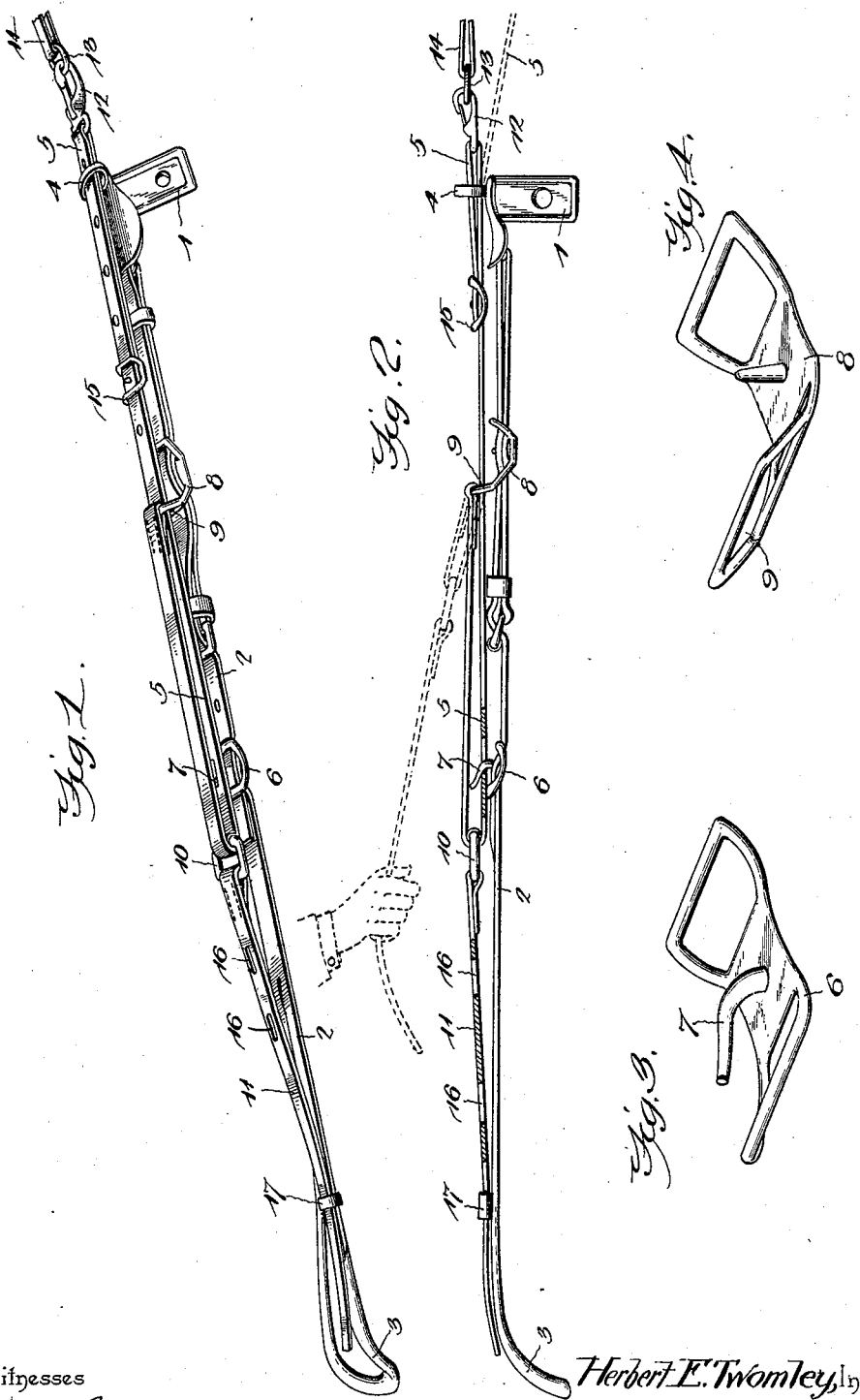
Witnesses
J. Grant Culverwell,
V. B. Hillyard.
Herbert E. Twomley, Inventor.
By his Attorneys,
C. A. Snow & Co.

UNITED STATES PATENT OFFICE.

HERBERT E. TWOMLEY, OF HILLSDALE, MICHIGAN, ASSIGNOR OF ONE-HALF TO C. H. GURNEY, OF SAME PLACE.

CHECKING OR UNCHECKING ATTACHMENT.

SPECIFICATION forming part of Letters Patent No. 620,382, dated February 28, 1899.

Application filed May 14, 1898. Serial No. 680,724. (No model.)

*To all whom it may concern:*

Be it known that I, HERBERT E. TWOMLEY, a citizen of the United States, residing at Hillsdale, in the county of Hillsdale and State of Michigan, have invented a new and useful Checkrein Attachment, of which the following is a specification.

The purpose of this invention is to devise easily-operated means of simple construction whereby a horse can be unchecked to admit of watering without requiring the occupant of the carriage or vehicle to dismount and which will admit of the rechecking of the animal when through drinking.

Other objects desired to be obtained are to avoid a cumbersome appearance, to admit of the attachment being readily adjustable to adapt it to animals of long or short couple, and to provide means which are positive in action, reliable, effective for the purpose intended, and which will preclude the accidental unchecking or releasing of the horse's head after it has been raised.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the invention in operative relation. Fig. 2 is a side elevation, the dotted lines showing the operation. Figs. 3 and 4 are detail views of the buckles.

Corresponding and like parts are referred to in the following description and indicated in the views of the drawings by the same reference characters.

The harness-saddle or back-pad 1, back-strap 2, and crupper 3 are well-known parts of a harness and are shown to illustrate the application of the present invention. The saddle or back-pad 1 is provided centrally with a terret 4, through which the front end portion of the checkrein-strap 5 operates. A buckle 6 is secured to the back-strap 2 near its rear end and is provided with a hook 7, which passes through one of a series of openings in the back-strap to secure the buckle thereon at the required position and which extends rearwardly and upwardly to engage with the checkrein-strap 5 and secure it in an adjusted position. A buckle 8 is secured to the front portion of the back-strap and is formed at its rear end with an additional loop 9, to which one end of the checkrein-strap 5 is secured. This buckle 8 is adjustable along the length of the back-strap and is held in a located position by having its spud or tongue passed through one of the series of openings of said back-strap.

The checkrein-strap 5 has its rear portion folded, and a link 10 is supported in the bight, so as to admit of a running connection being had between the checkrein-strap and the operating-strap 11, to which the link 10 is secured. The strap 5, as previously stated, is made fast to the loop 9 of the buckle 8 and after passing through the link 10 operates through the loop 9 and has its front portion folded and passing through the terret 4, a snap-hook 12 being supported in the front bight of the checkrein-strap and adapted to make detachable connection with the ring 13 of the overdraw or checkrein 14. The opposite end of the strap 5 is secured to a buckle 15, which makes adjustable connection with the strap 5, so as to admit of it being lengthened or shortened according to the length of the horse to which the attachment is fitted, so that the front portion of the strap 5 may pass through the terret 4.

The operating-strap 11 is formed with a series of openings 16, which are adapted to engage with the hook 7 to hold the strap in place when the animal is unchecked. The rear portion of the strap 11 is adapted to be thrust through a loop 17, applied to a member of the crupper, whereby said strap is held in place and prevented from shifting about. The checkrein-strap 5 is formed with a series of openings to receive the hook 7, whereby the horse's head may be raised to the required point.

When it is required to release the horse's head for drinking, grazing, or other purpose, the operating-strap 11 is released from the loop 17 and is lifted and drawn upon slightly, thereby disengaging the strap 5 from the hook 7, and upon permitting the strap 11 to move forward the horse is free to lower its head. To recheck the animal it is only necessary to draw upon the strap 11, and after the horse's head has been elevated sufficiently the strap 11 is lowered, so as to permit an opening of the strap 5 to engage with the hook 7, thereby securing the horse's head at the required position. By having the rear portion of the strap 5 doubled and making a running connection with the operating-strap the front end portion of the strap 5 moves twice the distance of the strap 11, and this construction prevents the strap 11 from getting beyond the reach of the driver or occupant of the carriage when the horse is unchecked and avoids the necessity for making the strap 11 of great length.

Having thus described the invention, what is claimed as new, and desired to be secured by Letters Patent, is—

1. Means for checking and unchecking horses as applied to harness, the same consisting of a checkrein-strap having its rear end portion folded and secured to the back-strap of the harness and having its front end in engagement with the overdraw or checkrein, means applied to the back-strap of the harness to make positive engagement with the rear end portion of the checkrein-strap and secure it in an adjusted position, and an operating-strap within convenient reach of the driver or occupant of the vehicle and having loose or running connection with the rear end of the checkrein-strap, substantially as and for the purpose set forth.

2. Means as applied to harness for checking and unchecking horses, consisting of a checkrein-strap having its rear end portion folded and secured to the back-strap of the harness and adapted to have its front end coupled to the overdraw or checkrein, an operating-strap having a link at its front end which is supported in the bight at the rear end of the checkrein-strap whereby the latter has running connection therewith, and a buckle applied to the back-strap of the harness and having a hook to secure the buckle in place and adapted to make adjustable and detachable connection with the checkrein-strap, substantially as and for the purpose set forth.

3. In means applied to harness for checking and unchecking a horse, the combination with a buckle applied to the back-strap and formed with an additional loop projecting above said back-strap, of a checkrein-strap secured to said additional loop and having its rear end portion folded and passing loosely through the aforedescribed loop, said checkrein-strap adapted to have connection at its front end with the overdraw, an operating-strap having running connection with the rear end of the checkrein-strap, and means for adjustably and detachably connecting the checkrein-strap with the back-strap of the harness, substantially as set forth.

4. In harness and a checking and unchecking means therefor, the combination of a terret applied centrally to the saddle or back-pad, a checkrein-strap having its front end portion folded and operating through the said terret and adapted to make connection with the overdraw, and having its rear portion folded and secured to the back-strap, an operating-strap loosely supported in the rear bight of the checkrein-strap whereby the latter has running connection therewith, and a hook applied to the back-strap and adapted to make adjustable and detachable connection with the checkrein-strap and the operating-strap, substantially as and for the purpose set forth.

5. The herein-described means for checking and unchecking horses as applied to harness, the same consisting of a terret located centrally of the harness-saddle or pad, a buckle adjustable upon the back-strap and having an additional or upwardly-extending loop, a second buckle fitted to the back-strap and having an upwardly and rearwardly extending hook, a checkrein-strap having its front end portion folded and passing through the aforesaid terret, and having its rear end portion adapted to make adjustable connection with the aforesaid hook, and passing loosely through the said additional loop, and folded and connected with said loop, and an operating-strap having a link at its front end loosely supported in the rear bight of the checkrein-strap, said operating-strap having openings in its length to make adjustable and detachable connection with the said hook, and adapted to have its rear end portion thrust through a loop applied to the crupper, substantially as set forth.

In testimony that I claim the foregoing as my own I have hereto affixed my signature in the presence of two witnesses.

HERBERT E. TWOMLEY.

Witnesses:
CHARLES H. GURNEY,
FRANCIS M. TWOMLEY.